United States Patent
Allison et al.

(10) Patent No.: US 7,780,005 B2
(45) Date of Patent: ***Aug. 24, 2010

(54) MULTIPLE SEGMENT VACUUM RELEASE HANDLING DEVICE

(75) Inventors: Claudia Leigh Allison, San Jose, CA (US); Darby Allen Davis, Fremont, CA (US); Philip John Haseltine, Santa Clara, CA (US)

(73) Assignee: Delphon Industries LLC, Hayward, CA (US)

( * ) Notice: Subject to any disclaimer, the term of this patent is extended or adjusted under 35 U.S.C. 154(b) by 1020 days.

This patent is subject to a terminal disclaimer.

(21) Appl. No.: 10/144,255

(22) Filed: May 10, 2002

(65) Prior Publication Data

US 2003/0211315 A1 Nov. 13, 2003

(51) Int. Cl.
 B65D 73/02 (2006.01)
 B25B 11/00 (2006.01)
(52) U.S. Cl. .................. 206/460; 206/524.8; 206/813; 206/829; 269/21
(58) Field of Classification Search .............. 206/460, 206/477, 557, 558, 701, 713, 714, 719, 524.8, 206/813, 829; 248/346.01; 442/149; 414/800; 428/34.1, 343; 269/21
See application file for complete search history.

(56) References Cited

U.S. PATENT DOCUMENTS

| | | | | |
|---|---|---|---|---|
| 4,667,944 A * | 5/1987 | Althouse | ............ | 269/21 |
| 4,711,014 A * | 12/1987 | Althouse | ............ | 29/412 |
| 4,778,326 A * | 10/1988 | Althouse et al. | ............ | 414/800 |
| 5,066,424 A * | 11/1991 | Dixon et al. | ............ | 252/513 |
| 5,603,983 A * | 2/1997 | Clough et al. | ............ | 427/126.3 |
| 5,648,136 A * | 7/1997 | Bird | ............ | 428/76 |
| 5,798,060 A * | 8/1998 | Brevett | ............ | 252/520.1 |
| 5,820,788 A * | 10/1998 | Smith | ............ | 252/511 |
| 5,964,352 A * | 10/1999 | Shoji | ............ | 206/713 |
| 6,132,645 A * | 10/2000 | Hedges | ............ | 252/510 |
| 6,136,137 A * | 10/2000 | Farnworth et al. | ............ | 156/344 |
| 6,202,292 B1 * | 3/2001 | Farnworth et al. | ............ | 29/743 |
| 6,203,621 B1 * | 3/2001 | Tran et al. | ............ | 269/21 |
| 6,235,385 B1 * | 5/2001 | Lee | ............ | 428/344 |
| 6,319,354 B1 * | 11/2001 | Farnworth et al. | ............ | 156/344 |
| 6,464,444 B1 * | 10/2002 | Tsuji et al. | ............ | 414/411 |
| 6,544,371 B2 * | 4/2003 | Senoo et al. | ............ | 156/230 |
| 6,640,864 B2 * | 11/2003 | Downs | ............ | 156/540 |

* cited by examiner

*Primary Examiner*—J. Gregory Pickett
(74) *Attorney, Agent, or Firm*—Haynes and Boone CanaanLaw, P.C.

(57) ABSTRACT

A vacuum release device is provided for temporarily immobilizing objects, the device comprising: a substrate; a plurality of vacuum release subunits which can be operated independent of each other, each vacuum release subunit comprising an adhesive layer over a surface of the substrate; and a spacing material positioned between the substrate and the adhesive layer so as to form a chamber within which a vacuum may be formed, application of the vacuum causing the adhesive layer to recess toward the chamber.

56 Claims, 10 Drawing Sheets

MULTIPLE SEGMENT VACUUM RELEASE HANDLING DEVICE

FIELD OF THE INVENTION

The present invention generally relates to the devices for use in combination with handling, storing and transporting small objects.

BACKGROUND OF THE INVENTION

Numerous industries incorporate thin and often fragile objects that need to be handled, stored and/or transported. The most common example is perhaps the semiconductor industry that employs a wide range of components and subcomponents such as die, substrates, chips, transistors, diodes, integrated circuits, microprocessors and wafers. Other industries that also have a need to handle, store and/or transport thin, fragile objects include the medical device industry (e.g., diamond scalpel, coils, and optics) telecommunications, optoelectronic and automotive.

Devices have been developed for these purposes. For example, U.S. Pat. Nos. 4,667,944, 4,711,014, and 4,778,326 describe devices for handling objects such as semiconductor chips, wafers, and the like where the device includes a sheet member to which the object adheres, the sheet being deformable using a vacuum so that the sheet member is made non-planar when it is draw away from the object by the vacuum, thereby reducing the adhesion force between the object and the sheet.

U.S. Pat. No. 4,966,281 describes an electronic component carrier having a series of electronic component-mounting portions that include a layer of adhesive. The adhesive is a rubber type, an acrylic type or a silicone type having suitable pressure sensitive adhesive properties. The use of a push bar enables smooth removal of the electronic component from the adhesive layer.

Further examples of devices that have been developed for these purposes are described in U.S. Pat. Nos. 4,760,916, 4,966,282, 5,089,314, 5,648,136 5,729,963, 5,769,237, and 5,833,073.

Despite these different devices, a need continues to exist for more effective devices for use in handling, storing and/or transporting small and fragile objects.

SUMMARY OF THE INVENTION

A device is provided for temporarily immobilizing objects, the device comprising: a container; an adhesive layer forming a surface of the container, the adhesive layer being adapted to temporarily immobilize one or more objects relative to the container through adhesion created between the adhesive layer and the one or more objects, the adhesive layer comprising between 1%-50% by weight of a conductive additive which increases a conductivity of the adhesive layer so as to reduce electrostatic charge accumulation of objects temporarily immobilized by the adhesive layer.

A device is also provided for temporarily immobilizing objects, the device comprising: a frame defining a perimeter; and an adhesive layer attached to the frame such that the adhesive layer extends across an interior area defined by the perimeter, the adhesive layer being adapted to temporarily immobilize one or more objects through adhesion created between the adhesive layer and the one or more objects, the adhesive layer comprising between 1%-50% by weight of a conductive additive which increases a conductivity of the adhesive layer so as to reduce electrostatic charge accumulation of objects temporarily immobilized by the adhesive layer.

A device is also provided for temporarily immobilizing objects, the device comprising: a substrate; at least one vacuum release subunit attached to the substrate, the vacuum release subunit comprising an adhesive layer that is adapted to temporarily immobilize one or more objects when no vacuum is applied to the vacuum release subunit, application of a vacuum to the vacuum release subunit causing the adhesive layer to partially move out of contact with the one or more object contacting the adhesive layer prior to the application of a vacuum; wherein the adhesive layer comprises between 1%-50% by weight of a conductive additive which increases a conductivity of the adhesive layer so as to reduce electrostatic charge accumulation of objects temporarily immobilized by the adhesive layer.

A vacuum release device is also provided for temporarily immobilizing objects, the device comprising: a substrate; a plurality of vacuum release subunits which can be operated independent of each other, each vacuum release subunit comprising an adhesive layer over a surface of the substrate; and a spacing material positioned between the substrate and the adhesive layer so as to form a chamber within which a vacuum may be formed, application of the vacuum causing the adhesive layer to recess toward the chamber.

A vacuum release device is also provided that comprises: an array of separate adhesive layers for immobilizing objects, each adhesive layer being attached to and/or forming a wall of a chamber within which a vacuum may be drawn where the vacuum deforms the adhesive layer by causing it to withdraw inward toward the chamber, wherein separate vacuums can be applied to deform each separate adhesive layer.

A device is provided for temporarily immobilizing objects, the device comprising: a substrate; two or more adhesive regions, each adhesive region comprising an adhesive layer surface adapted to temporarily immobilize one or more objects relative to the device through adhesion created between the adhesive layer surface and the one or more objects; and a non-adhesive region positioned between adjacent adhesive regions.

A device is provided that comprises: a frame defining a plurality of subframes, the subframes defining a plurality of sub-perimeters; and one or more adhesive layers attached to the frame such that the one or more adhesive layers extend across interior areas defined by the sub-perimeters of the subframes.

A method is also provided for temporarily immobilizing an object, the method comprising: taking a device comprising an adhesive layer that is attached to and extends across an area defined by a perimeter of a frame; attaching an object to a first surface of the adhesive layer; storing the object in the device wherein the object is grounded while it is attached to the adhesive layer via the frame; and removing the object from the adhesive layer by pushing an implement into a second, opposing surface of the adhesive layer that deforms a shape of the adhesive layer so as to reduce adhesion between the object and the adhesive layer.

BRIEF DESCRIPTION OF THE DRAWINGS

FIG. 2A(ii) illustrates the vacuum release device of FIG. 2A(i) where the flexible elastomer film is drawn into the cavities formed by the mesh by applying a vacuum.

FIG. 2B(ii) illustrates the device shown in FIG. 2B(i) where an implement is used to move the adhesive film at least partially out of contact with an object immobilized on the adhesive film.

DETAILED DESCRIPTION OF THE INVENTION

Figure 1:
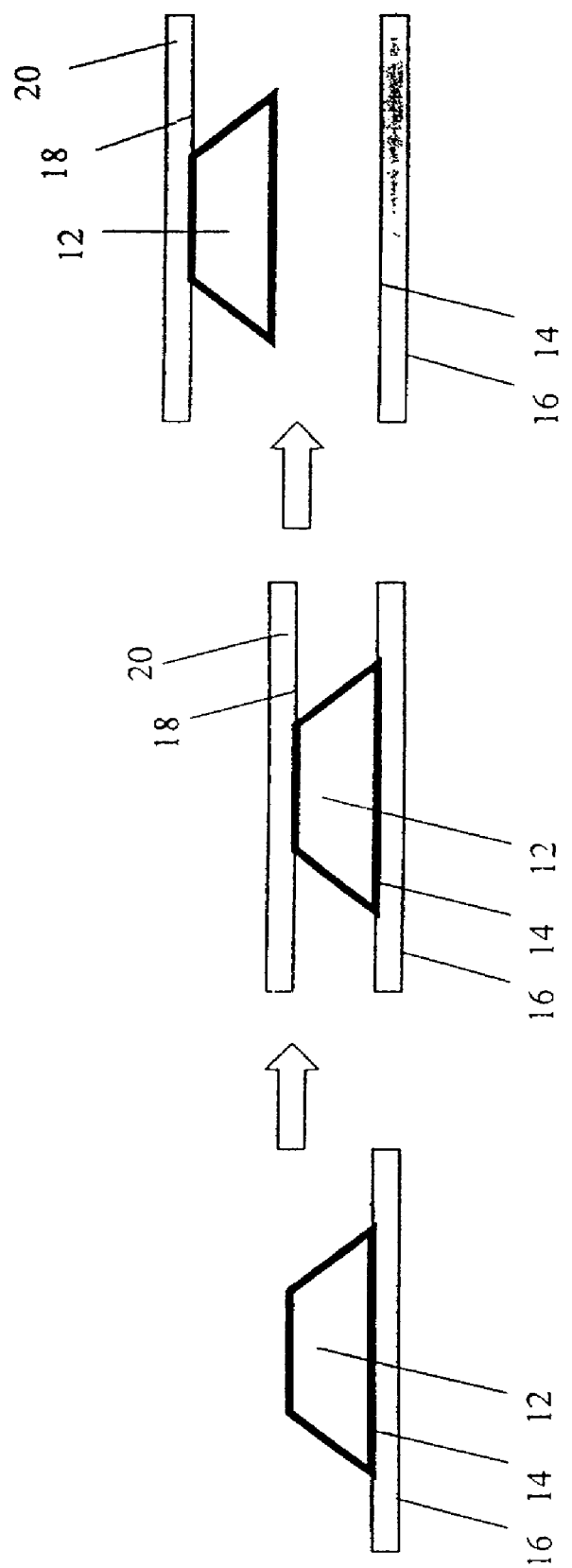
FIG. 1 illustrates a method where an object is immobilized on a first adhesive layer of a first device and then transferred to a second adhesive layer of a second device.

The present invention is directed to various devices that may be used to protect objects during transport, processing, inspection, and assembly. These objects are commonly relatively thin and often fragile.

In one embodiment, a vacuum release device is provided that comprises an adhesive layer for immobilizing an object, the adhesive layer being attached to and/or forming a wall of a chamber within which a vacuum may be drawn where the vacuum deforms the adhesive layer by causing it to withdraw inward toward the chamber. As a result of the vacuum, portions of the adhesive layer are drawn out of contact with an object adhering to the adhesive layer to cause an adhesive force between the adhesive layer and the object to be reduced.

In one variation, the device comprises a substrate; an adhesive layer that is applied over a surface of the substrate; and a spacing material, such as a mesh, that is positioned between the substrate and the adhesive layer so as to form a chamber within which a vacuum may be formed. The device may also include a release hole through which a vacuum may be formed within the chamber.

In a further variation, the device may optionally comprise a plurality of vacuum release subunits. Preferably, a vacuum can be applied independently to multiple of the plurality of vacuum release subunits.

Also according to this embodiment, the adhesive layer of the device may be designed to have low tack. Optionally, reduced tack may be achieved by patterning the surface of the adhesive layer. The reduced tack may also be achieved by admixing a non-adhesive or lower adhesive filler material when forming the adhesive layer.

Also according to this embodiment, regions of the adhesive layer may have differing properties. For example, the tack of the adhesive layer may vary in the different regions. Markings or colors may be used to identify the regions with different properties.

Also according to this embodiment, the device may also optionally prevent the build up of charges on the objects adhering to the adhesive layer in order to prevent a harmful electrostatic discharge from occurring. This may be achieved by increasing the conductivity of the adhesive layer. For example, conductive material may also be admixed into the adhesive layer in order to increase the conductivity of the adhesive layer. Optionally, material that is conductive relative to the adhesive layer may incorporated into the device such that the material contacts the adhesive layer. Optionally, the material, such as a mesh, that serves in the vacuum release device to define the chamber within which the vacuum may be drawn may be made of a relatively conductive material. Optionally, the device may further include a ground for grounding the adhesive layer.

In another embodiment, a device is provided that comprises a frame defining a perimeter, and an adhesive layer attached to the frame such that the adhesive layer extends across an area defined by the perimeter.

In one variation, the frame comprises a plurality of subframes, the subframes defining a plurality of sub-perimeters. Preferably, deforming the adhesive layer in a given sub-perimeter does not cause the adhesive layer to be deformed in another adjacent sub-perimeter.

Also according to this embodiment, the adhesive layer of the device may be designed to have low tack. Optionally, the reduced tack may be achieved by patterning the surface of the adhesive layer. The reduced tack may also be achieved by admixing a non-adhesive or lower adhesive filler material when forming the adhesive layer.

Also according to this embodiment, regions of the adhesive layer, for example within the different sub-perimeters, may have differing properties. For example, the tack of the adhesive layer may vary in the different regions. Markings or colors may be used to identify the regions with different properties.

Also according to this embodiment, the device may also optionally prevent the build up of charges on the objects adhering to the adhesive layer in order to prevent a harmful electrostatic discharge from occurring. This may be achieved by increasing the conductivity of the adhesive layer. For example, electrically conductive polymers may be used to form the adhesive layer. Conductive material may also be admixed into the adhesive layer in order to increase the conductivity of the adhesive layer. Optionally, material that is conductive relative to the adhesive layer may incorporated into the device such that the material contacts the adhesive layer. Optionally, the device may further include a ground for grounding the adhesive layer.

One advantage of the devices of the present invention is their temporary immobilization of objects. By temporarily immobilizing objects, it is possible to protect the objects from being damaged as a result of the objects bouncing into neighboring objects or walls of a container within which the objects would otherwise be placed. This prevents, for example, edges and other surfaces of the objects from being chipped or chafed during shipping and handling. This is particularly important in the semiconductor industry where objects can be quite fragile.

Another advantage of the devices of the present invention is the elimination of a need to custom mold devices for each different object to be housed. Rather, objects can adhere to a film used in the devices of the present invention, thereby eliminating the need for a recess custom shaped to hold a particular object.

Another advantage of the devices of the present invention is their temporary and long term storage of objects in a particular organization. By immobilizing the objects in a particular layout, specific ones of the objects can be readily located. This allows the objects to be readily located and inspected for damage and flaws.

Immobilizing the objects by the devices of the present invention also helps to avoid accidental loss and spillage of objects. For example, the objects are prevented from sticking in pockets and cavities where the objects can become hard to locate.

Another advantage of the devices of the present invention is the capture of dust fragments and other particles by an adhesive layer used in the devices. In addition to functioning to immobilize objects, the adhesive layer functions to trap unwanted particles that may otherwise come into contact with the objects.

As objects to be stored get smaller and more fragile, the need to storing objects in an organized way where they are protected from damage becomes more critical and more difficult to achieve. Described herein are particular design features of the devices of the present invention that further the performance of the devices in these regards relative to the current state of the art.

While this application's discussion in many instances is directed to the storage and transport of electronic and semiconductor related objects, it should be understood that the devices of the present invention have a far wider application to any object which is small, fragile, and in need of storage and/or transport.

Also, although the devices of the present invention are frequently described herein in relation to their use with small objects, it is noted that the devices may be sized for use with a variety of different sized objects. For example, the devices may be sized for use with larger objects like wafers having 8 inches or larger diameters.

1. Device Designs and Construction

A variety of different devices have been developed to date for use in handling, storing and/or transporting relatively thin and often fragile objects. Examples of these devices include, but are not limited to the devices described in U.S. Pat. Nos. 4,667,944, 4,711,014, 4,760,916, 4,778,326 4,966,281, 4,966,282, 5,089,314, 5,648,136 5,729,963, 5,769,237, and 5,833,073, each of which are incorporated herein by reference.

In general, these devices may be characterized as comprising an outer protective container. The outer container may have any of a variety of different shapes, including for example, a box or a tray. The container may be formed of a variety of different materials, most typically plastic, metal, or ceramic.

An interior surface of the outer protective container comprises an adhesive layer that is adapted to temporarily immobilize one or more objects within the container through the adhesion created between the adhesive layer and the objects. It is noted that the adhesive layer may optionally be removable from the container.

Unless otherwise specified herein, any adhesive that provides sufficient adhesive character to hold an object in place during normal handling, storage, and transport may be used. A wide range of materials may be used to provide the adhesive properties to the surface. For example, the adhesive layer may be formed using an acrylic base adhesive or a silicone base adhesive.

The adhesive preferably does not leave a residue on the object after the object has been removed from the adhesive layer as such residue could contaminate the object and other elements that the object may be placed in contact with. The adhesive also preferably does not substantially lose its adhesive properties after repeated contact with an object to be immobilized. This allows the device to be reusable. The adhesive also preferably is not sloughing.

In one particular embodiment, the adhesive layer has low tack. By reducing the tack, at least in a portion of the adhesive layer, the devices of the present invention can be made to be more compatible with thinner, more fragile devices. In some applications, it has been observed that objects are damaged by the adhesive force of the adhesive layer when the object is pulled away from the adhesive layer. For example, this has been observed with very thin wafers.

One particular application of low tack adhesive layers is their use in combination with vacuum release devices, such as those described herein. Another particular application of devices employing low tack is there use in transfer methods. For example, in one embodiment, a method is provided that comprises taking a first device having a first adhesive surface with a first level of tack; contacting the first adhesive surface with an object; and transferring the object to a second device having a second adhesive surface with a second, higher level of tack by contacting the object to the second adhesive surface, and pulling the object away from the first second adhesive surface of the first device by the adhesion of the second adhesive surface to the object. This method is illustrated in FIG. 1 where object 12 is immobilized on a first adhesive layer 14 of a first device 16, the object is then contacted with a second adhesive layer 18 of a second device 20, and is then transferred from the first device 16 to the second device 20 by separating the first device 16 relative to the second device 20.

It is noted that the method described in regard to FIG. 1 can be readily adapted for use with vacuum release devices. For example, device 16 may be a first vacuum release device and device 20 may be a second vacuum release device. When the object 12 is sandwiched between the first and second vacuum release devices, a vacuum may be drawn on the first vacuum release device in order to reduce the adhesiveness of that device to the object. This allows the second vacuum release device 20 to be more adhesive than the first vacuum release device 16 and thus allows the second vacuum release device 20 to pick the object 12 off the first vacuum release device 16.

In one variation, selected sections of the device have a lower tack. In order to facilitate their identification, these sections may be marked, for example by making them a different color, in order to identify them. Color or another form of marking may be used to facilitate differentiation, tracking and identification.

Forming an adhesive layer with lower tack may be accomplished in a variety of different manners. For example, an adhesive layer may be coated on a texturized or patterned relief surface. The adhesive layer may also be formed using a mold.

By adding texture to the adhesive surface, the planarity of the adhesive surface and hence the surface area of the adhesive surface that comes into contact with the object to be immobilized is reduced.

The level of tack of the adhesive layer may also be reduced by admixing a non-adhesive or lower adhesive filler material, such as silicon carbide, calcium carbonate, clay, silica, and talc, into the material that is used to form the adhesive layer. Through this mixing, non-adhesive material will be dispersed at the surface of the adhesive layer and thus reduce the percentage of the adhesive layer's surface area that is adhesive.

The level of tack of the adhesive layer may also be reduced by adjusting the formulation of the adhesive layer. For example, by using an elastomer and increasing the cross-linking of the elastomer, the resulting tackiness of the elastomer can be reduced.

The thickness of the adhesive layer may be varied depending on the application. The adhesive layer is preferably at least 0.1 mil thick and, in general, should be sufficiently thick for the adhesive layer not to be damaged by the forces associated with removing objects adhering to the adhesive layer. This allows the device to be reusable. When the adhesive layer forms a surface of a container, the thickness is typically between 1 and 500 mil thick, optionally between 1 and 300 mil thick or between 1 and 250 mil thick or between 1 and 200 mil thick. When the adhesive layer is a film, such as a film extending across a frame or in a vacuum release device, the thickness is typically less than 35 mil thick, and may be less than 20, 10, 5 or even 1 mil thick. Films as thin as 0.1 mil may optionally be used.

The adhesive layer is preferably washable. It is also preferably solvent and chemical resistant, particularly relative to lapping oils and slurries. The adhesive layer is also preferably formed of a material that can withstand temperatures of at least 200° C.

Optionally, the adhesive layer may be formed of a material that is activated by ultraviolet light.

Figure 2A:
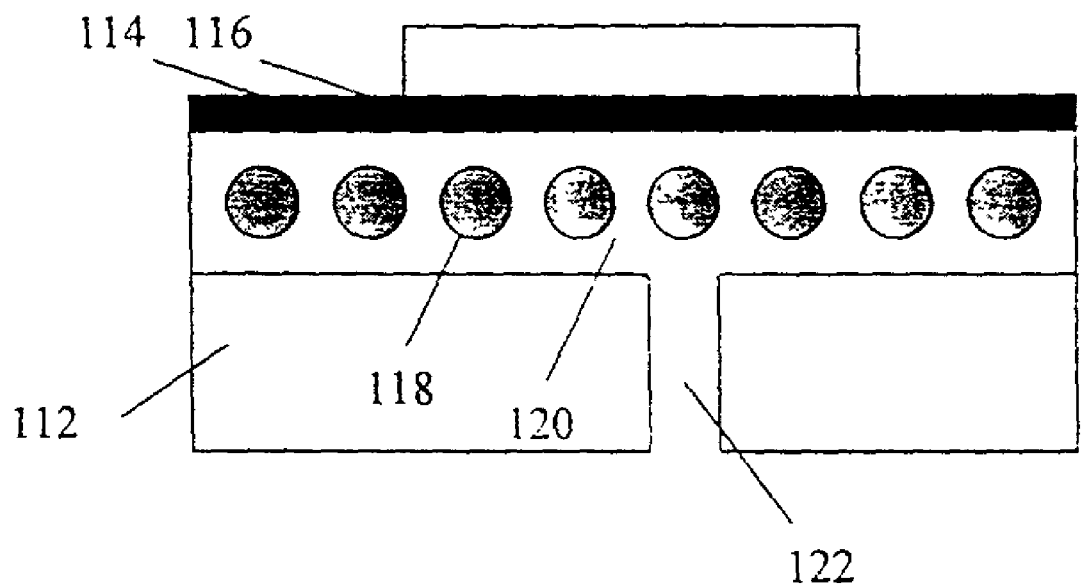
FIG. 2A(i) illustrates an example of a vacuum release device comprising a tray that has a surface on which objects may be immobilized.
Figure 2A:
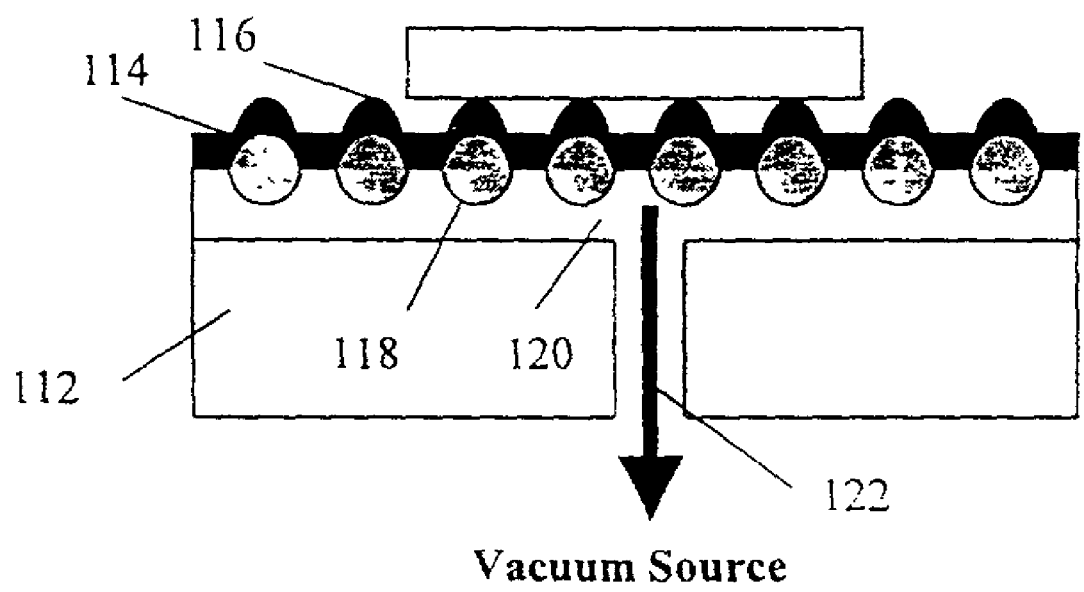
Figure 2B:
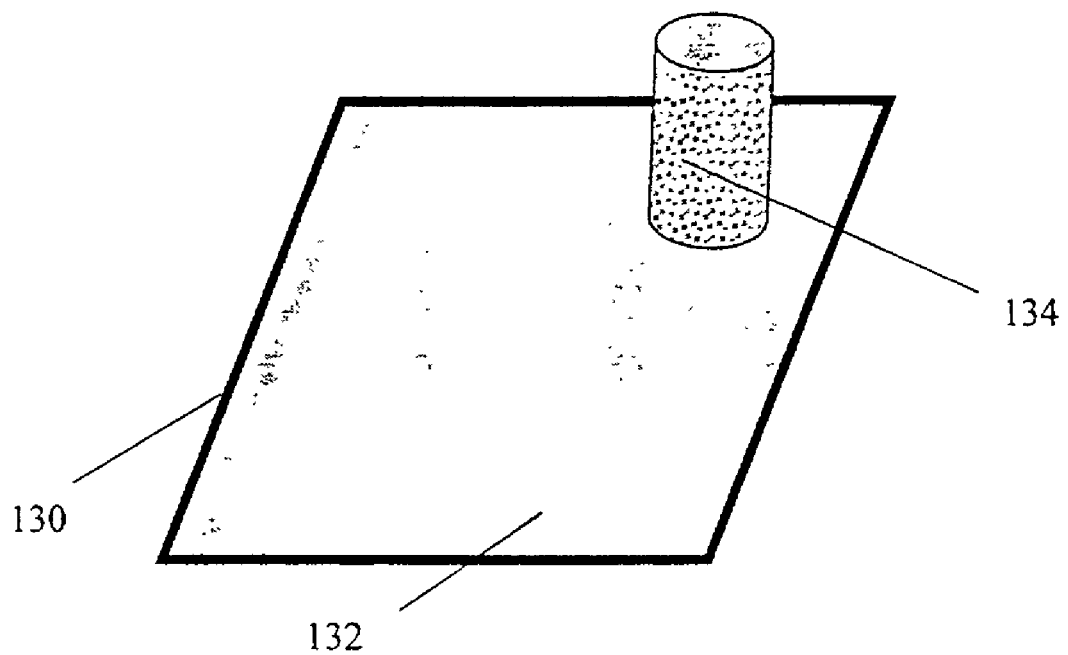
FIG. 2B(i) illustrates a device comprising a frame and an adhesive film extending within a perimeter of the frame.
Figure 2B:
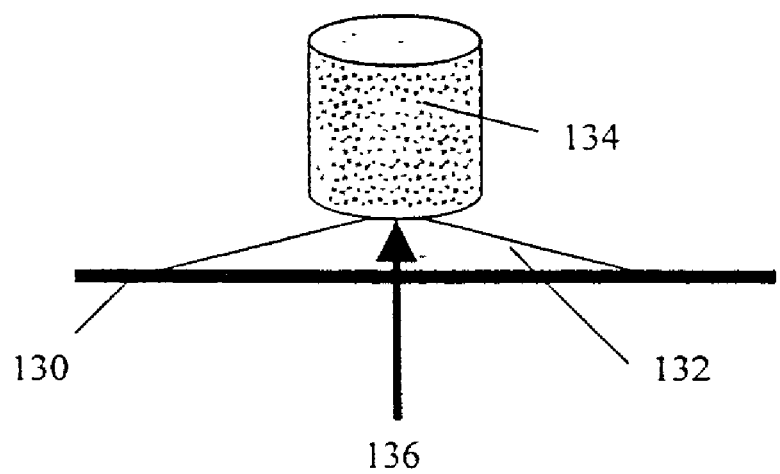
Figure 2C:
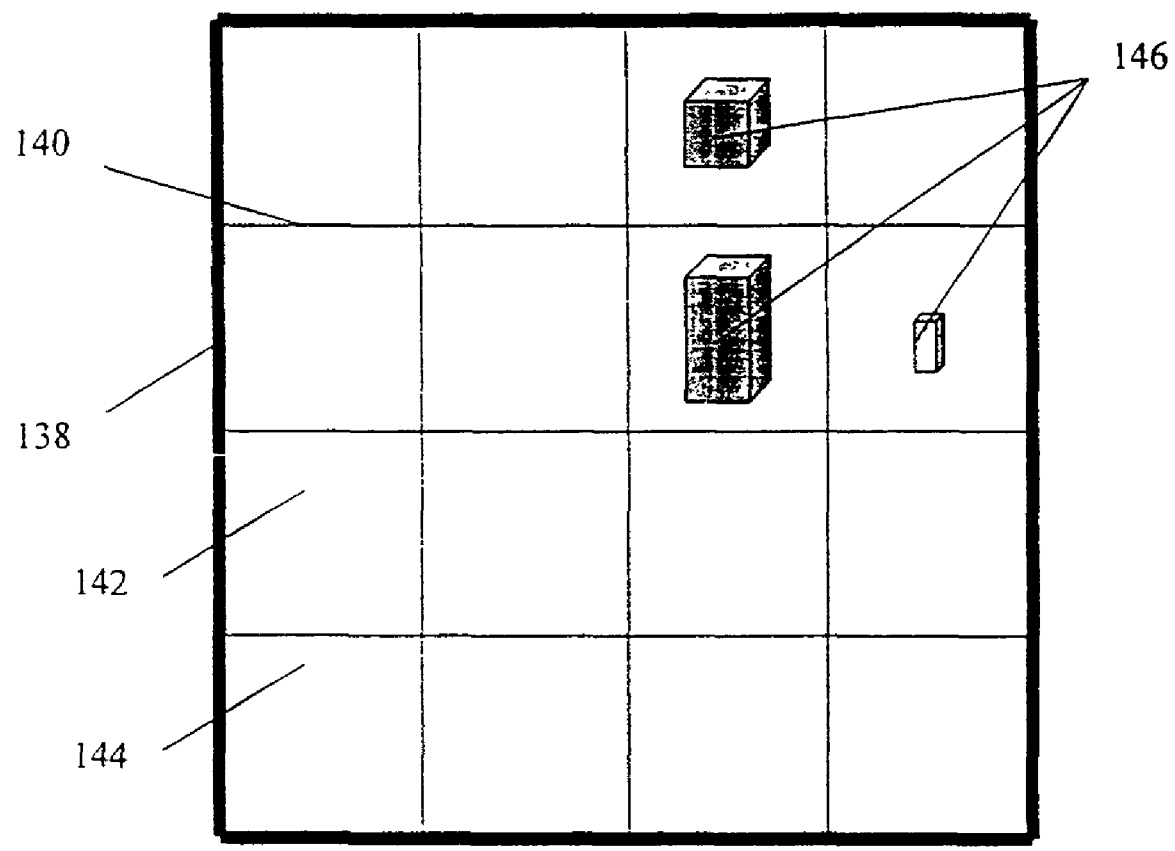
FIG. 2C illustrates a variation of the device shown in FIGS. 2B(i) and 2B(ii) where the frame has a plurality of subsection defining subframes that define a plurality of subsections which are each supported by portions of the frame.

FIGS. 2A-2C illustrate several examples of devices in which a low tack film according to the present invention may be employed. It is noted that other devices for immobilizing small objects other than the ones illustrated herein may also be used.

FIG. 2A(i) illustrates an example of a vacuum release device comprising a substrate 112 and an adhesive layer 116 (shown as a thin, flexible elastomer film) that is applied over a surface 114 of the substrate 112. The adhesive layer 116 has an adhesive surface. A spacing material 118, such as a mesh (such a metal, plastic or synthetic fabric mesh) is positioned between the substrate 112 and the adhesive layer 116 so as to form a chamber 120 within which a vacuum may be formed. A release hole 122 is formed in the substrate 112 through which a vacuum may be formed within the chamber.

By forming a vacuum within the chamber 120, portions of the adhesive layer 116 may be drawn toward the chamber. When a mesh is employed, the adhesive layer is drawn into the cavities formed by the mesh 118 (shown as arrows). This withdrawal of the adhesive layer 116 moves portions of the adhesive layer 116 out of contact with an object positioned over the adhesive layer 116, shown in FIG. 2A(ii). The adhesive force between the object and an adhesive film 116 is thus reduced by the vacuum.

The adhesive layer 116 should be sufficiently thick that it does not independently sag into the cavities formed by the mesh in the absence of a vacuum. This may also be accomplished by stretching the adhesive layer 116 relative to the mesh 118.

It is noted that the adhesive layer 116 may be formed of one or more regions having differing levels of tack. The different regions may be identified by markings or by color to identify their locations.

FIGS. 2B(i) and 2B(ii) illustrate a device comprising a frame 130 and an adhesive film 132 extending within a perimeter of the frame 130. As illustrated, an object 134 may be placed into contact with the adhesive film 132. The shape of the adhesive film 132 may be deformed, illustrated by pushing an opposing side of the adhesive film 132 with an implement 136, in order to make the adhesive film 132 nonplanar adjacent the object 134, thereby moving the adhesive film 132 at least partially out of contact with the object 134. As can be seen in these figures, edges of the object can be more readily accessible for handling.

FIG. 2C illustrates a variation of FIGS. 2B(i) and 2B(ii) where the frame 138 has a plurality of subsection defining subframes 140 that define a plurality of subsections 142 which are each supported by portions of the frame. In this instance, the shape of the adhesive film 144 in one of the subsections may be deformed, illustrated by pushing an opposing side of the adhesive film 144 in order to make the adhesive film 144 nonplanar adjacent an object 146 in that section. Meanwhile, the shape of the adhesive film in other subsections are not changed. It is noted that the plurality of subsections may have the same or different level of tack. This may be achieved by using a different film in the different subsections or by patterning a surface of the film in the different subsections differently.

2. Vacuum Release Devices

One particularly significant type of device in which aspects of the present invention may be employed is vacuum release devices. FIGS. 2A(i) and 2A(ii), described above, illustrate an embodiment of a vacuum release device. In general, a vacuum release device relates to any device that comprises an adhesive layer that forms a wall of a chamber within which a vacuum may be drawn where the vacuum deforms the adhesive layer by causing it to withdraw inward toward the chamber. As a result, portions of the adhesive layer are drawn out of contact with an object adhering to the adhesive layer. This causes the adhesive force between the adhesive layer and the object to be reduced. The design and operation of vacuum release devices are described in further detail in U.S. Pat. Nos. 4,667,944, 4,711,014, and 4,778,326.

By being able to deform the adhesive layer with a vacuum, these devices allow the level of adhesion between the adhesive layer and a device to be varied at will by simply drawing a vacuum. The adhesive layer preferable takes on its original shape when the vacuum is released, thus making these devices reusable.

Once a vacuum is drawn, removal of the object may be performed by any of a variety of different methodologies, for example, using tweezers or vacuum pick-up tools.

One particular application of vacuum release devices are where the object may be deformed or damaged if one has to pull the device off the adhesive layer. For example, the device is useful for shipping wafers after they have been diced but are still on the adhesive layer. Die edges can be extremely sensitive to damage if there is any flexing of the film during transit. A larger format device prevents this from happening by completely immobilizing the wafer or the individual die.

The vacuum may be created by a variety of different tools. In one embodiment, the vacuum is created by a release station that comprises a valve box and vacuum chuck or plate. The valve box connects to a vacuum source that may be dedicated or house and controls the vacuum at the plate. Typically a vacuum of at least 25 inches Hg is used.

A more particular embodiment of a vacuum release device will now be described with reference to FIGS. 3A-3B.

Figure 3A:
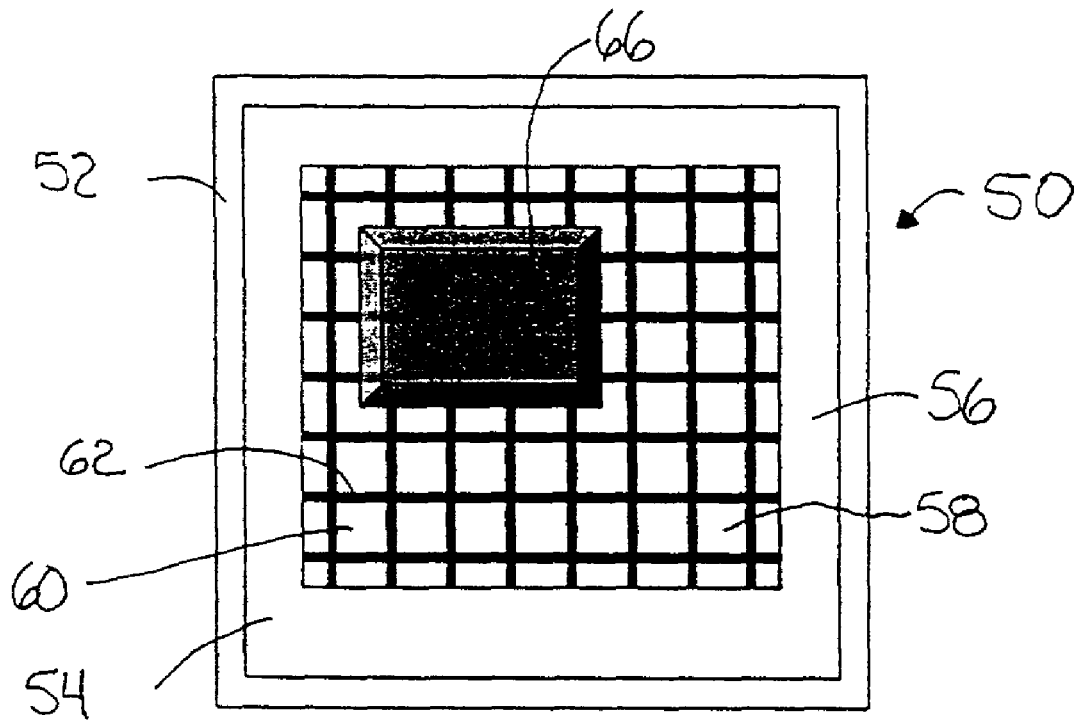
FIG. 3A provides a plan view of an embodiment of a vacuum release device.

Shown in FIG. 3A is a device which comprises a substrate 52 formed of a rigid material such as glass, plastic, metal, or the like. The substrate 52 has an upper face 54 formed with flat narrow edges 56 and a recess 58 there within.

An adhesive layer 60 in the form of a thin flexible film, or sheet, is attached to the face 54 of the substrate 52, a portion of which is shown broken away in FIG. 3A for clarity. A plurality of adhesive layer-supporting contact points 62 are located within the margin edges of the base, the upper faces of which contact points are provided in the plane of the margins 56.

Figure 3B:
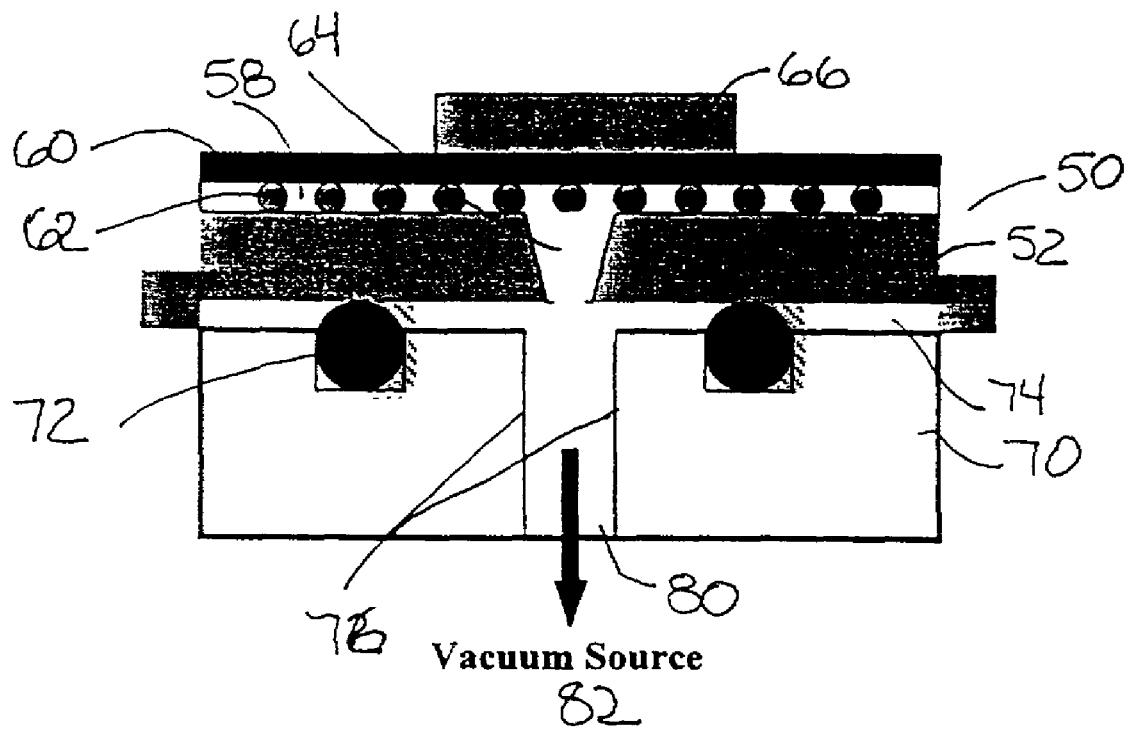
FIG. 3B provides a sectional view of FIG. 3A.

The contact points 62 illustrated in FIGS. 3A-3B are arranged in the form of a two-dimensional array in which adjacent contact points extend at right angles to each other. Preferably, the contact points are dimensioned such that the recess 58 is made up of only short straight line segments, with no long segments extending, say, between opposite margins of the carrier at any angle.

The adhesive layer 60 is arranged to the upper face of the substrate 52 in sealing engagement therewith, which attachment may be effected by any suitable mechanism including, for example, the use of an adhesive, not shown, or simply by non-adhesive frictional and interfacial forces between the smooth flat upper face of the substrate and the marginal edges of the adhesive layer. With the adhesive layer 60 attached to the substrate 52, a chamber or cavity is defined between the recess 58 in the substrate 52 and the attached adhesive layer 60, which chamber is adapted for connection to a low air pressure, or vacuum, source through a port 64 formed in the substrate 52.

An object, in this case a semiconductor chip 66 is shown resting on the surface of the adhesive layer 60. The adhesive layer 60 may, for example, comprise an elastomeric member having a smooth upper face to provide for high interfacial retention forces between the sheet and the smooth-faced device 66 supported thereon. Alternatively, a pressure sensitive adhesive (not shown) may be provided at the upper face of the adhesive layer 60 for adhesive retention of the object 66 thereon. The adhesive properties of the adhesive layer 60 functions to hold the object so that the object cannot be readily removed using conventional tweezers or vacuum techniques while the adhesive layer 60 is in a flat position illustrated in FIGS. 3A-3B.

To facilitate removal of the object 66 from the adhesive layer 60, the surface contact area between the adhesive layer 60 and the object 66 is reduced by drawing portions of the adhesive layer 60 adjacent the recess 58 downwardly into the recess. To pull portions of the adhesive layer 60 which are adjacent the recess downwardly into the recess, the air chamber defined between the recess and the adhesive layer 60 may be connected to a vacuum, or low pressure, source.

During removal of the object, the substrate 52 may be supported on a vacuum chuck, or table, 70 which is provided with members 72 which help define a recess 74 in the upper face thereof. Downwardly extending walls 76 on the substrate 52 adjacent the members 72 of the chuck when the substrate 52 is positioned on the chuck, and a substantially fluid tight chamber is defined between the bottom of the substrate 52 and recess 74 in the chuck. A passageway 80 in the vacuum chuck is provided for connection of the recess 74 to a vacuum, or low pressure, source 82. Low pressure in the chamber between the chuck 70 and substrate 52 is communicated through the passageway 64 in the substrate 52 to the recess 58 in the face of the substrate 52 whereupon the adhesive layer 60 is drawn downwardly into the recess. Surface contact between the object 66 and the adhesive layer 60 is reduced by withdrawal of portions of the adhesive layer 60 into the recess 58, thereby reducing the magnitude of the force by which the object is attached to the adhesive layer, thereby allowing ready removal of the object by a vacuum needle, tweezers, or the like.

As can be seen, vacuum release devices have the property of converting the adhesive layer 60 from a flat condition, for full surface contact with the object 66, to a wavy or undulating condition for a reduction in the surface contact between the adhesive layer 60 and objects supported thereon. Vacuum release devices may be adapted for use with a wide variety of chip sizes; with the number and size of contact points 62 employed in the substrate 52 being selected in relation to the size of the objects 66 to be handled. The relative dimensions are such that the object is supported through the adhesive layer 60 in a level condition by one or more of the contact points, and remains level when portions of the adhesive layer 60 are drawn downwardly into the recess in the substrate 52.

An object which is too small for proper use with the device 50 could be drawn down with the adhesive layer 60 into a recess, which would not facilitate removal of the object from the device.

With the contact points shown in FIGS. 3A-3B, the resultant recess is a short segment. This avoids the creation of a long straight line crease in the substrate 60 when portions of the adhesive layer 60 are drawn into the recess 58. This helps to avoid adhesion of the surface along an entire edge of an object with the depressed portion of the adhesive layer and resultant tilting of the object on the carrier.

As noted above, the adhesive layer 60 may comprise an elastomeric film which returns to a smooth, flat, condition upon release of the vacuum in the recess 58 for reuse of the device including the adhesive layer 60. An elastomeric member may be formed using a suitable curable liquid polymer such as a curable two part silicone elastomer material which may be formed with smooth opposite faces. Use of an elastomer having a Shore A hardness of from about 15 to about 90 is practical, with a range of between about 30 to 65 Shore A being preferred. Obviously, other factors including thickness of the adhesive layer 60, configuration of the recess 58, and vacuum employed also determine the degree of texturing, or waviness, which is obtained. In one arrangement, a silicone elastomeric film about 16 mil thick and having a Shore A hardness of 35 is used in combination with a vacuum of approximately 20 psi. With this elastomeric material, retention forces between the bottom face of the adhesive layer 60 and the smooth upper face of the substrate 52 normally are sufficiently great such that no adhesive or other such bonding mechanism is required to provide an adequate seal there between to obtain the necessary vacuum. Also, objects 66 that are placed on the adhesive layer 60 with a slight pressure to assure good contact between the adhesive layer 60 and the objects, are tightly held in position on the film by frictional and interfacial forces so long as the adhesive layer 60 remains in the flat condition. Even when the tray is turned over, objects remain attached to the adhesive layer 60 and are not readily removed by a vacuum needle.

3. Devices Employing Multiple Immobilization Segments

One aspect of the present invention relates to devices that comprise a plurality of separate immobilization segments. Any of the devices described above may be designed to comprise a plurality of separate immobilization segments. In one particular variation, the plurality of separate immobilization segments are each vacuum release segments.

FIGS. 4A-4F illustrate several embodiments of devices that comprise a plurality of separate immobilization segments. It is noted that FIG. 2C, described above, represents another example of a device with a plurality of separate immobilization segments.

Figure 4A:
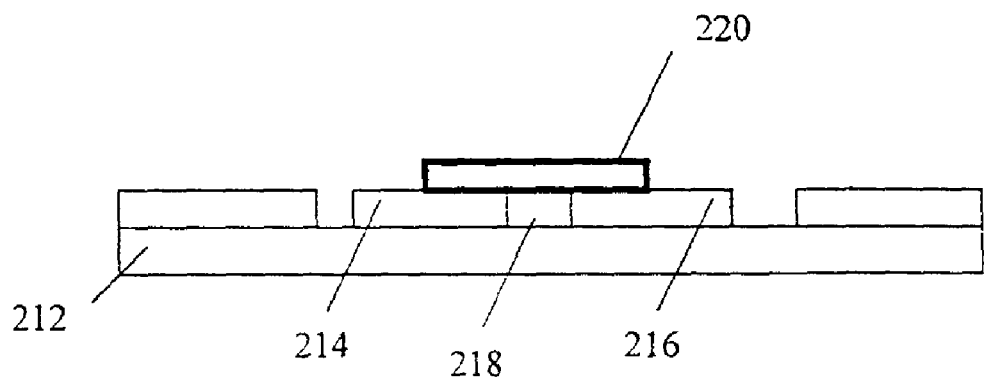
FIG. 4A illustrates an embodiment of a device where adjacent immobilization segments are separated by a region that does not have an adhesive layer for immobilizing an object.

FIG. 4A illustrates an embodiment of a device 212 where adjacent immobilization segments 214, 216 are separated by a region 218 that does not have an adhesive layer for immobilizing an object 220. Preferably, as illustrated, the upper surface of region 218 is below a plane of the adjacent immobilization segments 214, 216 such that an implement, such as a tweezers, may be positioned beneath the object 220 in order to pick up the object 220. Adjacent immobilization segments 214, 216 may or may not be vacuum release segments.

Figure 4B:
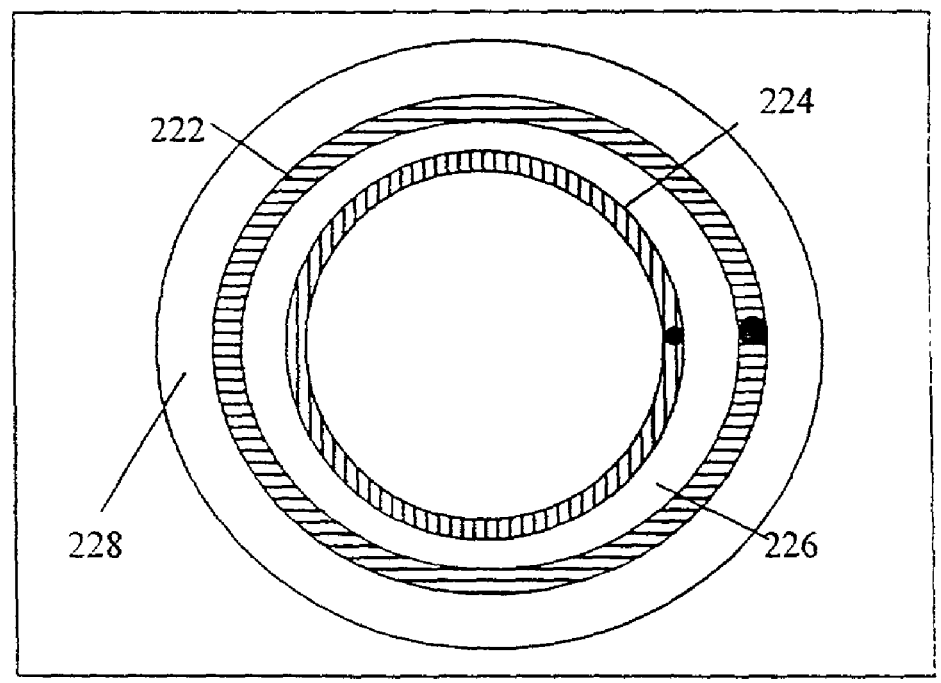
FIG. 4B illustrates an embodiment of a device where adjacent immobilization segments form concentric rings that are separated by a ring shaped region which does not have an adhesive layer for immobilizing an object.

FIG. 4B illustrates another embodiment of a device 214 where adjacent immobilization segments 222, 224 form concentric rings that are separated by a ring shaped region 226 which does not have an adhesive layer for immobilizing an object. In this embodiment, adjacent immobilization segments 222, 224 again may or may not be vacuum release segments. As illustrated, an object 228 may be in contact with the adjacent immobilization segments 222, 224. It is noted that the object may sized so that it fits within a footprint defined by the adjacent immobilization segments 222, 224 or, as illustrated, may be larger than the footprint provided by the adjacent immobilization segments 222, 224.

Figure 4C:
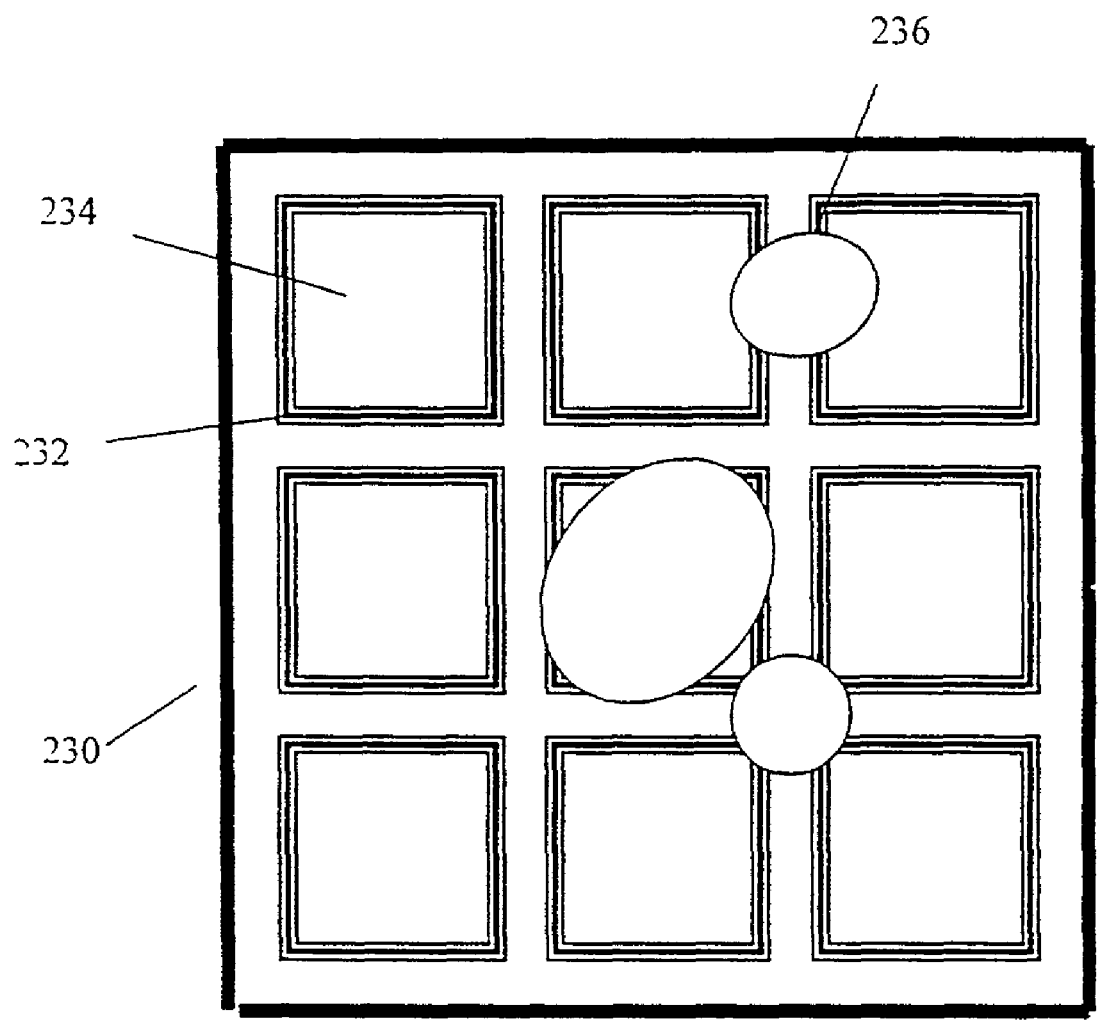
FIG. 4C illustrates an embodiment of a device where adjacent immobilization segments form a perimeter around a region that does not have an adhesive layer for immobilizing an object.

FIG. 4C illustrates another embodiment of a device 230 where adjacent immobilization segments 232 form a perimeter around a region 234 that does not have an adhesive layer for immobilizing an object 236. In this variation, an object can be held by one or more edges of the device. As illustrated, the object may also be immobilized by one or more adjacent immobilization segments. This is advantageous if one wishes to prevent portions of the device from being placed in contact with the adhesive layer. In this embodiment, adjacent immobilization segments 236 again may or may not be vacuum release segments.

Figure 4D:
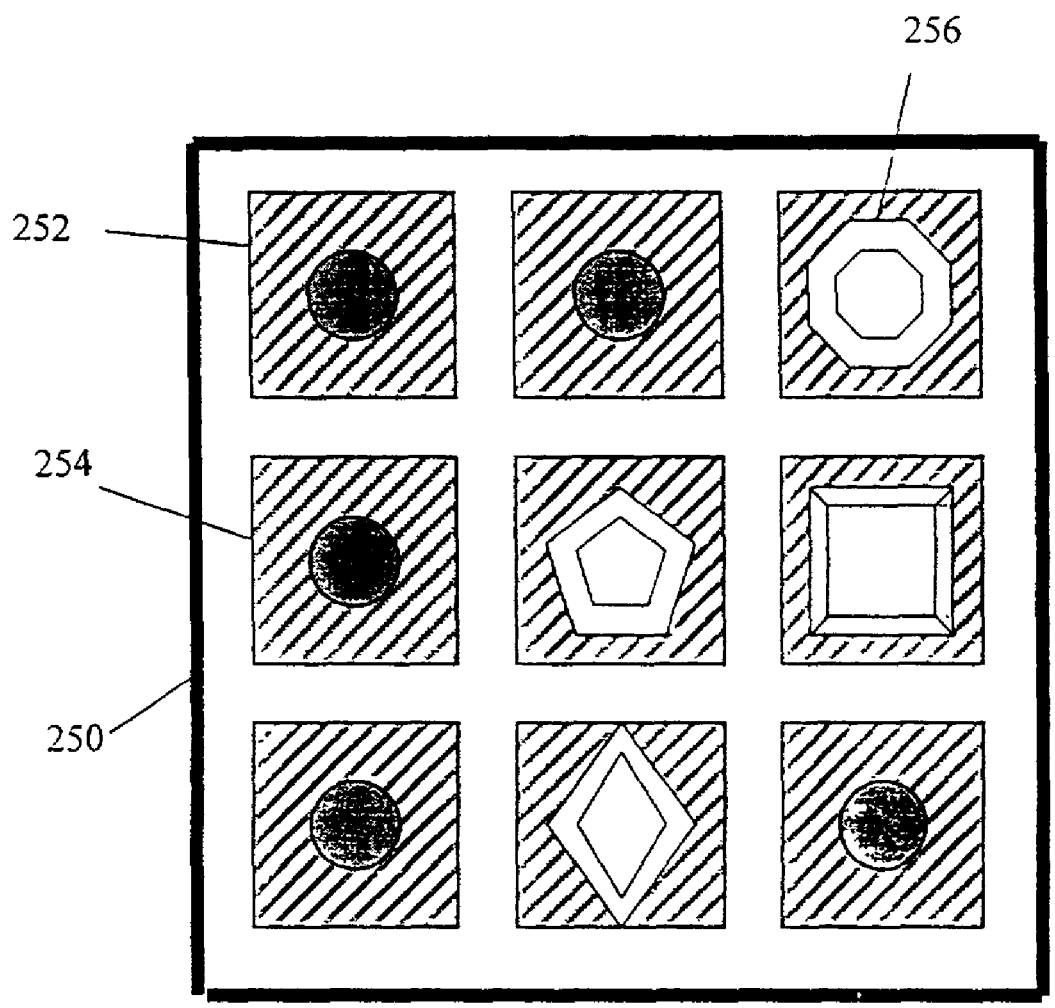
FIG. 4D illustrates another embodiment of a device where adjacent immobilization segments each comprise a member under the segment which can be pushed upward to lift the object from a given immobilization segment.

FIG. 4D illustrates another embodiment of a device 250 where adjacent immobilization segments 252 each comprise a member 254 under the segment which can be pushed upward to lift the object from a given immobilization segment. By having a separate member 254 for each segment, it is possible to control which of a plurality of objects 256 attached to immobilization segments 252 are released at any given time.

Figure 4E:
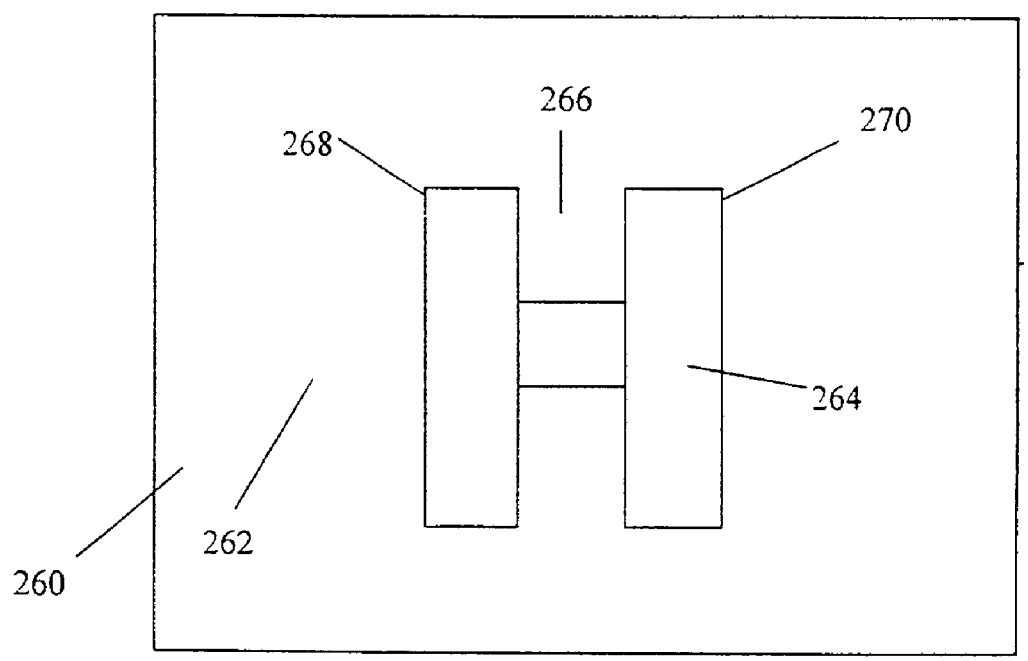
FIG. 4E provides an embodiment of a vacuum release device which defines a region positioned between portions of the vacuum release device that is below a surface of the vacuum release device.

FIG. 4E provides an embodiment of a vacuum release device which defines a region positioned between portions of the vacuum release device that is below a surface of the vacuum release device. The shape of the vacuum release device thus provides multiple immobilization segments. As illustrated, the device 260 comprises a substrate 262; and a vacuum release device 264 positioned on the substrate and shaped so as to define a region 266 that is positioned between the portions 268, 270 of the vacuum release device, the region 266 positioned between portions 268, 270 having a surface below the surface of portions 268, 270 of the vacuum release device such that a planar object in contact with the vacuum release device does not come into contact with the region 266 between the portions 268, 270 of the vacuum release device. As illustrated, the vacuum release device may be in the shape of an H.

Figure 4F:
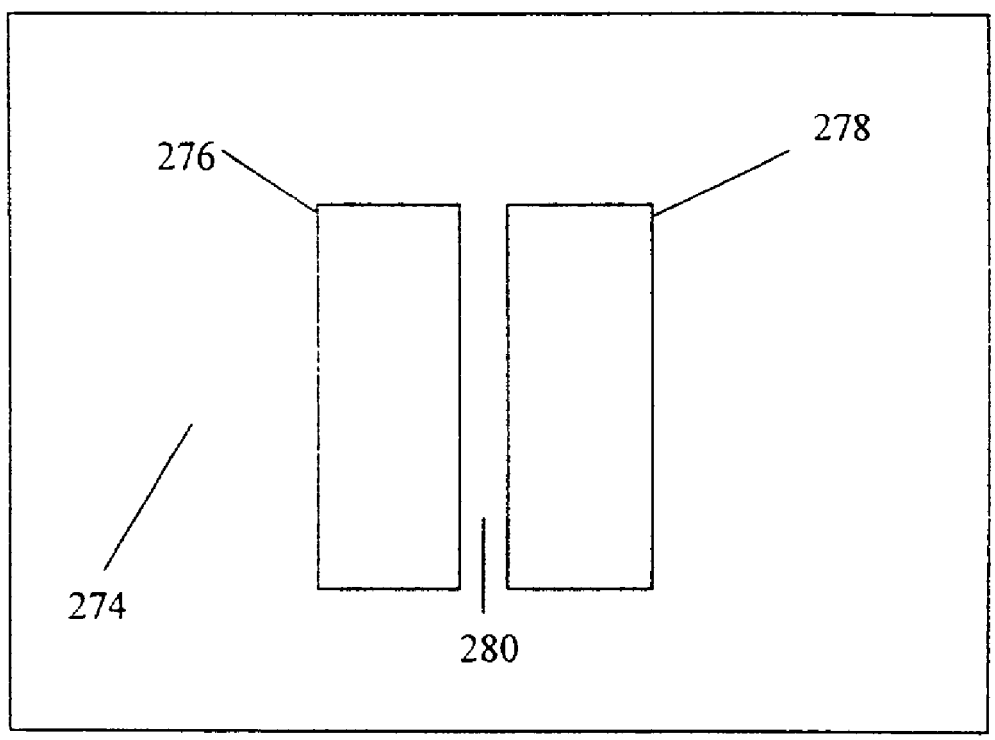
FIG. 4F provides an embodiment of device comprising two vacuum release devices positioned on a substrate such that there is a region positioned between the two vacuum release devices that has a surface below the surface of the two vacuum release devices such that a planar object in contact with the two vacuum release devices does not come into contact with the region between the two vacuum release devices.

FIG. 4F provides an embodiment of device comprising two vacuum release devices positioned on a substrate such that there is a region positioned between the two vacuum release devices that has a surface below the surface of the two vacuum release devices such that a planar object in contact with the two vacuum release devices does not come into contact with the region between the two vacuum release devices. As illustrated, the device comprises a substrate 274; two vacuum release devices 276, 278 positioned on the substrate; and a region positioned 280 between the two vacuum release devices that has a surface below the surface of the two vacuum release devices 276, 278 such that a planar object in contact with the two vacuum release devices does not come into contact with the region between the two vacuum release devices.

One advantage of devices such as those illustrated in FIGS. 4A-4F is that a portion of the object being held by the device may contact an adhesive layer of a segment while another portion of the object being held by the device may be kept from contacting the adhesive layer. This may be important for preventing the object being held from being contaminated by the adhesive layer. It may also be important for isolating the object. It may also be important for allowing inspection of edges of an object while the object is attached to the device Another advantage of devices such as those illustrated in FIGS. 4A-4F is that the devices are able to hold objects of irregular sizes.

Yet another advantage of devices such as those illustrated in FIGS. 4A-4F is that the devices can be designed for used in conjunction with customized handling processes. For example, it may be desirable to pick up an object by a certain portion of the object. It is possible to position that certain portion of the object to coincide with the region without the adhesive layer.

4. Devices Providing for Electrostatic Discharge

Optionally, the various devices for immobilizing objects described herein may include an electrostatic discharge mechanism to prevent electrostatic charge build-up in objects being stored in the devices of the present invention. In many small semiconductor applications, the objects being stored can be damaged if subjected to an electrostatic discharge. It is noted that problems with electrostatic discharge become more significant as the size of objects become smaller and are thus more sensitive to damage as a result of electrostatic discharge events.

In order to create an electrostatic discharge safe environment, the devices of the present invention may be adapted in several ways. For example, the adhesive layer may be modified to have antistatic or conductive properties. This may be achieved by increasing the conductivity of the adhesive layer.

A conductive adhesive layer may be formed by the addition to the adhesive layer of conductive additives such as carbon based powders and fibers (e.g., carbon blacks), conductive polymers, and conductive based powders and fibers (e.g., silver, copper, iron), metal coated fibers of carbon or glass, metal oxide coated substrates, intrinsically conductive polymers (ICP) and inherently dissipative polymers (IDP). In one variation, the adhesive layer comprises 1%-50%, 1%-40%, 1%-30%, 1%-25%, 5%-50%, 5%-40%, 5%-30%, or 5%-25% of the conductive additive. In one variation, the conductive additive is an ICP with a surface resistivity of less than $10^5$ ohm/square. In another variation, the conductive additive is an IDP with a surface resistivity of between $10^5$-$10^{12}$ ohm/square.

The concentration of these materials should be sufficient to result in the adhesive layer having a low enough resistance (or high enough level of conductivity) so as to allow charges to flow through the adhesive layer away from the objects before an electrostatic discharge at a damaging level occurs.

In one variation, the conductive adhesive layer comprises one or more intrinsically conductive polymers (ICPs). In general, intrinsically conductive polymers have a conjugated π-electron backbone which provides the ability to support positive and negative charge carriers with high mobility along the polymer chain. Examples of intrinsically conductive polymers include, but are not limited to, semiconducting conjugated polymers such as polyaniline, polypyrrole, polythiophene, poly(phenylenevinylene), polyfluorene, and polyacetylene.

A conductive layer of ICP on nanoparticles may also be used. U.S. Pat. No. 6,132,645 describes such conductive nanoparticles and their preparation.

One particular example of ICPs on nanoparticles is commercially available from Geotech under the trade name EEONOMER®. These conductive particles are prepared via in-situ polymerization and deposition of ICPs into a carbon black or other matrix, may also be used as a conductive additive. Possessing greater thermal-oxidative stability than ICPs (up to 300° C.), EEONOMER® allows for processing into the majority of plastics and thermosets currently being processed in industry today without degradation or loss of conductivity. The carbon black/ICP composite results in a much reduced surface area and pore volume of the carbon black. Consequently melt processing of EEONOMER® into a variety of plastics leads to conductive blends with improved electrical, mechanical and melt flow properties and greatly reduced compounding difficulties and easier end-product fabrication. For example, in certain plastic systems (ABS, nylons, polyesters etc.) ½ of EEONOMER® loading versus a typical carbon black is needed to achieve the same conductivity level. Due to improved compatibility, EEONOMER®/plastic compounds show reduced sloughing when compared to carbon black loaded compounds. Also, EEONOMER® loaded heterogeneous plastic alloys (TPO, etc.) exhibit at least a 10 fold increase in conductivity compared to high structure carbon black loaded alloys at the same loading level. Furthermore EEONOMER® added into silver loaded thermoset systems leads to improved thermal and electrical conductivity.

EEONOMER® by nature is a very diverse conductive additive. The synthetic process is such that its physical properties can be fine-tuned to meet the broad range of requirements and also the rigorous demands of compounding and final product manufacturing. For example, tuning opportunities include the variation of the type and amount of conductive polymer and also its acidity and associated dopant ion. The carbon black type may also be varied.

It is very difficult to make carbon black based compounds with consistent resistivity in the anti-static to static-dissipative range because the required loadings lay on the vertical part of the percolation curve. Specially designed EEONOMER® allow the resistivity of the adhesive layer to be tuned reproducibly.

Other examples of conductive additives that may be used include Bayer BAYTRON® which is a conductive polymer similar to EEONOMER® but is based on polythiophene, B F Goodrich STATRITE polymers (See U.S. Pat. No. 5,237,009), Oxirane copolymer, Laponite, PEBAX® from Elf Atochem and polyethers including blends of polyamide & polyethylene glycol with polyether. Additional examples of polymers are described in U.S. Pat. Nos. 5,503,756 and 5,476,599.

It is noted that the addition of conductive, antistatic materials should be balanced relative to the tack, elasticity and other desired operational properties of the adhesive layer.

It is also noted that the adhesive layer is preferably slough resistant. This may be achieved, for example, by adding intrinsically conductive polymers to the adhesive layer Table 1 provides preferred ranges for various properties of ESD adhesive layers according to the present invention. Also provided in Table 1 are methods by which the different properties can be measured. It is noted that adhesive layers may however depart from these ranges and remain within the scope of the present invention.

Examples of other tests that may be to evaluate ESD properties include, but are not limited to Tribocharge with glove, arcing, resistance to ground, peel off test—removal of release liner, and shielding effectiveness.

It is note that the present invention also relates to the films used to provide ESD properties. Specifically, it is recognized that one may produce or sell the film which have desired ESD properties. This film may then be cut by the end user and incorporated into various devices, including those which applicants describe herein.

The devices are also preferably designed so that they provide a complete path for charges to flow from the objects to the adhesive layer and then to a ground associated with the device. This may be achieved by having the adhesive layer be in contact with a material having an equivalent and preferably lower electrostatic discharge level than the adhesive layer. As a result, this material in contact with the adhesive layer will be conductive relative to the adhesive layer and thus will allow charges to flow away from the adhesive layer. As noted above in regard to the vacuum release devices, the mesh used to define a sealable chamber may be formed of a conductive material, such as a metal, to function as the material drawing charges away from the adhesive layer.

The relatively conductive material may constitute a ground or may be operably connected to or connectable to a ground. In one embodiment, a grounding tab is included in the device that is in electrical communication (directly or indirectly) with the adhesive layer. In one variation, the grounding tab is a metal tab or wire that grounds the device to a work surface or to object loading and/or unloading tools that may be used in combination with the devices.

4. Examples of ESD Formulations

Described herein are examples of adhesive layer formulations that may be used for forming adhesive layers with desirable ESD properties. It is noted that these formulations are exemplary and may be varied without departing from the present invention. Miscellaneous additives may optionally be added for viscosity control.

In one embodiment, an adhesive layer formulation may comprise a silicone resin, a silicone curing agent (1-20% of resin weight), and Eeonyx Eeonomer® 51 (5-50% of resin weight). In another embodiment, an adhesive layer formulation may comprise a silicone resin, a silicone curing agent (1-20% of resin weight), and Degussa Conductive Carbon Black (5-50% of resin weight).

It is noted that the ESD formulas may further comprise a surfactant (0.1-10%) as well as a solvent (1-40%) such as methyl ethyl ketone.

In the process of evaluating and designing conductive adhesive layers, it is advantageous to lower the resistance of the adhesive layer by the addition of conductive particles in order to allow electron movement within the polymer. Electron movement is dependent upon the concentration of the conductive additive and the separation between particles. Desirably, the percolation point for the polymer is identified, defined as the distance from the polymer where resistance decreases dramatically and electrons move rapidly (each particle must contact at least two adjacent particles to impart electrical conductivity). Once the percolation point is reached, each additional point of contact is an added increment of resistance; addition of more conductive additive acts as an added increment of resistance.

TABLE 1

|  | Definition | Preferred range | Measurement Method |
|---|---|---|---|
| Surface Resistivity | Surface area electrical resistance in ohm/square | Static Dissipative $10^5$ to $\leq 10^{12}$ ohm/square Conductive $<10^5$ ohm/square Insulative $>10^{12}$ ohm/square | ESD STM 11.11 Surface Resistance Measurement of Static Dissipative Planar Materials ASTM D 257 Standard Test Methods for DC Resistance or Conductance of Insulating Materials |
| Volume Resistivity | Volume area electrical resistance in ohm-centimeter | Static Dissipative $10^4$ to $\leq 10^{11}$ ohm-centimeter Conductive $<10^4$ ohm-centimeter Insulative $>10^{11}$ ohm-centimeter | ANSI ESD STM 11.12 Volume Resistance Measurement of Static Dissipative Planar Materials ASTM D 257 Standard Test Methods for DC Resistance or Conductance of Insulating Materials |
| Tribocharge | Generation of electrostatic charge when two materials make contact or are rubbed together, then separated | Voltage $<25$ V | ESD ADV11.2 Triboelectric Charge Accumulation Testing |
| Static Decay | Time it takes for an object to decay a charge. | 2 seconds or less from 1000 V to 100 V | Federal Test Standard 101C, Method 4046 Electrostatic Properties of Materials |

The foregoing description of various embodiments of the invention has been presented for purposes of illustration and description. It is not intended to limit the invention to the precise forms disclosed. Many modifications and equivalent arrangements will be apparent.

We claim:

1. A vacuum release device for temporarily immobilizing objects, the device comprising:
a substrate;
a plurality of vacuum release subunits which can be operated independent of each other, each vacuum release subunit comprising
an adhesive layer over a surface of the substrate; and
a spacing material positioned between the substrate and the adhesive layer so as to form a chamber within which a vacuum may be formed, application of the vacuum causing the adhesive layer to recess toward the chamber;
wherein a spacer structure is positioned between adjacent vacuum release subunits and separates the adjacent vacuum release subunits, the entire spacer structure being below adhesive layers of the adjacent vacuum release subunits such as to allow an object to be placed across the adjacent vacuum release subunits without touching the surface of the spacer structure.

2. A vacuum release device according to claim 1 wherein the spacing material is a mesh.

3. A vacuum release device according to claim 1 wherein the spacing material is conductive relative to the adhesive layer.

4. A vacuum release device according to claim 1 wherein the spacing material is formed of a conductive metal.

5. A vacuum release device according to claim 1 wherein the device further includes a ground for grounding the adhesive layer.

6. A vacuum release device according to claim 1 wherein the adhesive layer used in the plurality of vacuum release subunits comprises a conductive additive.

7. A vacuum release device according to claim 1 wherein the adhesive layer used in the plurality of vacuum release subunits comprises between 1%-50% by weight of a conductive additive.

8. A vacuum release device according to claim 1 wherein the adhesive layer used in the plurality of vacuum release subunits comprises between 1%-25% by weight of a conductive additive.

9. A vacuum release device according to claim 1 wherein the adhesive layer used in the plurality of vacuum release subunits comprises between 5%-50% by weight of a conductive additive.

10. A vacuum release device according to claim 1 wherein the adhesive layer used in the plurality of vacuum release subunits comprises between 5%-25% by weight of a conductive additive.

11. A vacuum release device according to claim 1 wherein the adhesive layer used in the plurality of vacuum release subunits comprises a carbon based powder or fiber.

12. A vacuum release device according to claim 1 wherein the adhesive layer used in the plurality of vacuum release subunits comprises a conductive polymer.

13. A vacuum release device according to claim 1 wherein the adhesive layer used in the plurality of vacuum release subunits comprises a conductive based powder or fiber.

14. A vacuum release device according to claim 1 wherein the adhesive layer used in the plurality of vacuum release subunits comprises metal coated fibers of carbon or glass.

15. A vacuum release device according to claim 1 wherein the adhesive layer used in the plurality of vacuum release subunits comprises metal oxide coated substrates.

16. A vacuum release device according to claim 1 wherein the adhesive layer used in the plurality of vacuum release subunits comprises an intrinsically conductive polymer.

17. A vacuum release device according to claim 1 wherein the adhesive layer used in the plurality of vacuum release subunits comprises an inherently dissipative polymer.

18. A vacuum release device according to claim 1 wherein the adhesive layer used in the plurality of vacuum release subunits comprises nanoparticles coated with an intrinsically conductive polymer.

19. A vacuum release device according to claim 1 wherein the adhesive layer used in the plurality of vacuum, release subunits comprises one or more polymers selected from the group consisting of polyaniline, polypyrrole, polythiophene, poly(phenylenevinylene), polyfluorene, and polyacetylene.

20. A vacuum release device according to claim 1 wherein the adhesive layer comprises a texturized or patterned relief surface.

21. A vacuum release device according to claim 1 wherein the adhesive layer comprises an agent to reduce a degree of tack of the adhesive layer selected from the group consisting of silicon carbide, calcium carbonate, clay, silica and talc.

22. A vacuum release device according to claim 1 wherein the adhesive layer used in the plurality of vacuum release subunits have different levels of tack.

23. A vacuum release device according to claim 1 wherein the vacuum release subunits are marked differently to indicate different tack levels.

24. A vacuum release device according to claim 1 wherein the adhesive layer used in the plurality of vacuum release subunits does not slough.

25. A vacuum release device according to claim 1 wherein the adhesive layer used in the plurality of vacuum release subunits is between 0.1 mil and 35 mil thick.

26. A vacuum release device according to claim 1 wherein the adhesive layer used in the plurality of vacuum release subunits is between 0.1 mil and 20 mil thick.

27. A vacuum release device according to claim 1 wherein the adhesive layer used in the plurality of vacuum release subunits is between 0.1 mil and 10 mil thick.

28. A vacuum release device according to claim 1 wherein the adhesive layer used in the plurality of vacuum release subunits is between 0.1 mil and 5 mil thick.

29. A vacuum release device comprising:
an array of separate adhesive layers for immobilizing objects, each adhesive layer being attached to and forming a wall of a chamber within which a vacuum may be drawn where the vacuum deforms the adhesive layer by causing it to withdraw inward toward the chamber, wherein separate vacuums can be applied to deform each separate adhesive layer, and wherein the adhesive layers are separated by a spacer structure, wherein the entire spacer structure is positioned lower than the adhesive layers.

30. A vacuum release device for temporarily immobilizing objects, the device comprising:
a substrate;
a first vacuum release subunit built on a surface of the substrate comprising a first adhesive layer over a surface of the substrate, and a spacing material positioned between the substrate and the first adhesive layer so as to form a chamber within which a vacuum may be formed, application of the vacuum causing the first adhesive layer to recess toward the chamber; and
a second vacuum release subunit built on the surface of the substrate comprising a second adhesive layer over a surface of the substrate, and a spacing material positioned between the substrate and the second adhesive layer so as to form a chamber within which a vacuum may be formed, application of the vacuum causing the second adhesive layer to recess toward the chamber, wherein vacuum can be applied independently to the first vacuum release subunit and the second vacuum release subunit;
wherein the first and second vacuum release subunits are spaced apart by a spacer structure, the entire spacer structure positioned lower than the first and the second adhesive layers.

31. A vacuum release device according to claim 30 wherein the chambers formed by the first and second vacuum release subunits are separate chambers.

32. A vacuum release device according to claim 30 wherein the first and second vacuum release subunits each comprise a separate vacuum release hole.

33. A vacuum release device according to claim 30 wherein the spacing material is conductive relative to the first and second adhesive layers.

34. A vacuum release device according to claim 30 wherein the spacing material is formed of a conductive metal.

35. A vacuum release device according to claim 30 wherein the device further includes a ground for grounding the first and second adhesive layers.

36. A vacuum release device according to claim 30 wherein the adhesive layer used in the vacuum release subunits comprises between 1%-50% by weight of a conductive additive.

37. A vacuum release device according to claim 30 wherein the adhesive layer used in the vacuum release subunits comprises between 1%-25% by weight of a conductive additive.

38. A vacuum release device according to claim 30 wherein the adhesive layer used in the vacuum release subunits comprises between 5%-50% by weight of a conductive additive.

39. A vacuum release device according to claim 30 wherein each of the first and the second adhesive layers used in the vacuum release subunits comprises between 5%-25% by weight of a conductive additive.

40. A vacuum release device according to claim 30 wherein each of the first and the second adhesive layers used in the vacuum release subunits comprises a carbon based powder or fiber.

41. A vacuum release device according to claim 30 wherein each of the first and the second adhesive layers used in the vacuum release subunits comprises a conductive polymer.

42. A vacuum release device according to claim 30 wherein each of the first and the second adhesive layers used in the vacuum release subunits comprises a conductive based powder or fiber.

43. A vacuum release device according to claim 30 wherein each of the first and the second adhesive layers used in the vacuum release subunits comprises metal coated fibers of carbon or glass.

44. A vacuum release device according to claim 30 wherein each of the first and the second adhesive layer used in the vacuum release subunits comprises metal oxide coated substrates.

45. A vacuum release device according to claim 30 wherein each of the first and the second adhesive layers used in the vacuum release subunits comprises an intrinsically conductive polymer.

46. A vacuum release device according to claim 30 wherein each of the first and the second adhesive layers used in the vacuum release subunits comprises an inherently dissipative polymer.

47. A vacuum release device according to claim 30 wherein each of the first and the second adhesive layers used in the vacuum release subunits comprises nanoparticles coated with an intrinsically conductive polymer.

48. A vacuum release device according to claim 30 wherein each of the first and the second adhesive layers used in the vacuum release subunits comprises one or more polymers selected from the group consisting of polyaniline, polypyrrole, polythiophene, poly(phenylenevinylene), polyfluorene, and polyacetylene.

49. A vacuum release device according to claim 30 wherein the first and the second adhesive layers have different levels of tack.

50. A vacuum release device according to claim 30 wherein the vacuum release subunits are marked differently based on their different levels of tack.

51. A vacuum release device according to claim 30 wherein the first and the second adhesive layers used in the vacuum release subunits do not slough.

52. A vacuum release device according to claim 30 wherein each of the first and the second adhesive layers used in the vacuum release subunits is between 0.1 mil and 35 mil thick.

53. The vacuum release device of claim 1 wherein the adhesive layer returns to its original form after the vacuum is released.

54. The vacuum release device of claim 29 wherein each separate adhesive layer is returned to its original shape by releasing the vacuum that is applied thereto.

55. A vacuum release device for temporarily immobilizing objects, the device comprising:
a substrate;
a plurality of vacuum release subunits which can be operated independent of each other, each vacuum release subunit comprising
an adhesive layer over a surface of the substrate; and
a spacing material positioned between the substrate and the adhesive layer so as to form a chamber within which a vacuum may be formed, application of the vacuum causing the adhesive layer to recess toward the chamber;
wherein a spacer region is positioned between adjacent vacuum release subunits and separates the adjacent vacuum release subunits, the spacer region being below adhesive layers of the adjacent vacuum release subunits such as to allow a flat object to be placed across the adjacent vacuum release subunits without touching the surface of the spacer region.

56. A vacuum release device for temporarily immobilizing objects, the device comprising:
a substrate;
a plurality of vacuum release subunits which can be operated independent of each other, each vacuum release subunit comprising
an adhesive layer over a surface of the substrate; and
a spacing material positioned between the substrate and the adhesive layer so as to form a chamber within which a vacuum may be formed, application of the vacuum causing the adhesive layer to recess toward the chamber;
wherein a spacer structure is positioned between adjacent vacuum release subunits and separates adhesive layers of the adjacent vacuum release subunits, the entire spacer structure being below the adhesive layers of the adjacent vacuum release subunits such as to allow an object to be placed across the adjacent vacuum release subunits without touching the surface of the spacer structure.

* * * * *